(12) United States Patent
Zhu et al.

(10) Patent No.: US 9,882,754 B2
(45) Date of Patent: Jan. 30, 2018

(54) DATA TRANSMISSION METHOD AND APPARATUS

(71) Applicant: Huawei Technologies Co., Ltd., Shenzhen (CN)

(72) Inventors: Jun Zhu, Shanghai (CN); Jiayin Zhang, Shanghai (CN); Yalin Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/235,484

(22) Filed: Aug. 12, 2016

(65) Prior Publication Data

US 2016/0352553 A1 Dec. 1, 2016

Related U.S. Application Data

(63) Continuation of application No. PCT/CN2014/072025, filed on Feb. 13, 2014.

(51) Int. Cl.
*H04L 27/26* (2006.01)
*H04W 84/12* (2009.01)

(52) U.S. Cl.
CPC ...... *H04L 27/2602* (2013.01); *H04L 27/2614* (2013.01); *H04W 84/12* (2013.01)

(58) Field of Classification Search
CPC .. H04L 24/26; H04L 27/2602; H04L 27/2614
See application file for complete search history.

(56) References Cited

U.S. PATENT DOCUMENTS

| 2011/0194544 | A1 | 8/2011 | Yang et al. |
| 2011/0216814 | A1 | 9/2011 | Browning et al. |
| 2014/0071874 | A1* | 3/2014 | Li ............ H04N 19/65 370/311 |
| 2016/0352556 | A1* | 12/2016 | Zhu ............ H04B 7/0426 |

FOREIGN PATENT DOCUMENTS

| CN | 103297379 A | 9/2013 |
| CN | 103503395 A | 1/2014 |

OTHER PUBLICATIONS

Sameer Vermani et al., "Preamble Format for 1 MHz", IEEE 802.11-11/1482r4, Jan. 2012, 8 pages.

* cited by examiner

*Primary Examiner* — Jaison Joseph

(57) ABSTRACT

A data transmission method and apparatus are provided, which can improve a throughput rate of a system, and improve data transmission performance and user experience. The method comprises determining a target bit sequence. In the system state, a peak-to-average power ratio PAPR corresponding to the target bit sequence is less than a PAPR that corresponds to a bit sequence corresponding to the data length of the target data. The method comprises adding the target bit sequence to length bits that are in a legacy signal field of a target preamble, and performing transmit power enhancement processing on a legacy short training field, a legacy long training field, and the legacy signal field that are in the target preamble according to the transmit power amplification limit.

16 Claims, 3 Drawing Sheets

100

A transmit end device determines, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end — S110

Add the target bit sequence to length bits that are in a legacy signal field of a target preamble, perform transmit power enhancement processing on a legacy short training field field, a legacy long training field, and the legacy signal field that are in the target preamble according to the transmit power amplification limit, and send the target preamble to the receive end, where the target preamble and the target data are carried in a same data frame — S120

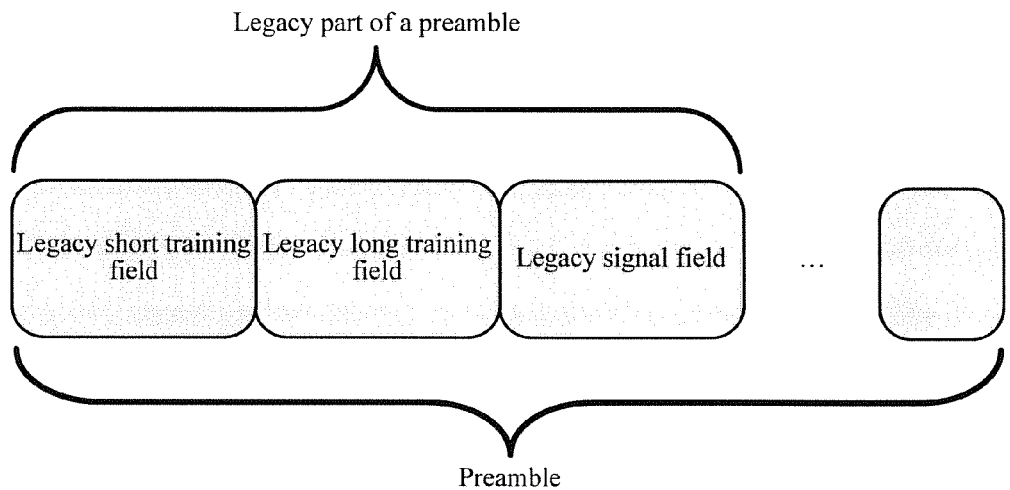

A transmit end device determines, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end

S110

Add the target bit sequence to length bits that are in a legacy signal field of a target preamble, perform transmit power enhancement processing on a legacy short training field field, a legacy long training field, and the legacy signal field that are in the target preamble according to the transmit power amplification limit, and send the target preamble to the receive end, where the target preamble and the target data are carried in a same data frame

DATA TRANSMISSION METHOD AND APPARATUS

CROSS REFERENCE TO RELATED APPLICATIONS

This application is a continuation of International Application No. PCT/CN2014/072025, filed on Feb. 13, 2014, which is hereby incorporated by reference in its entirety.

TECHNICAL FIELD

Embodiments of the present invention relate to the field of communications technologies, and in particular, to a data transmission method and apparatus.

BACKGROUND

With development of semiconductor technologies, and standardization of wireless local area networks (WLAN, Wireless Local Area Networks) by 802.11 standards, costs of WLAN technologies are greatly reduced, and the WLAN technologies are also applied increasingly widely. At present, versions of the 802.11 standards already evolve from 802.11a/b into 802.11g, 802.11n, and 802.11ac, and interoperability between products of the 802.11 versions of needs to be authenticated through rigorous testing.

To ensure backward-compatibility and interoperability between products of different versions of the 802.11 standards, starting from 802.11n, a mixed format (MF, Mixed Format) preamble (which is referred to as preamble for short below) is defined. A legacy part of the preamble includes a legacy field that is the same as that of 802.11a.

FIG. 1 shows a structure of an existing preamble. As shown in FIG. 1, a legacy part of the preamble includes three fields, that is: a legacy short training field (L-STF, Legacy-Short Training Field), a legacy long training field (L-LTF, Legacy-Long Training Field) field, and a legacy signal (L-SIG, Legacy-Signal) field, where the L-STF field is used to detect start of frame, set automatic gain control (AGC, Auto Gain Control), estimate an initial frequency offset, and synchronize an initial time; the L-LTF is used to more precisely estimate a frequency offset and synchronize a time, and is also used to generate channel estimation for receiving and balancing the L-SIG; and the L-SIG field is mainly used to carry data rate information and data length information, so that a receive end device can determine a length of data according to the data rate information and the data length information, where the data and the preamble are carried in a same frame, so as to determine an appropriate time to remain idle.

However, in a situation of a poor transmission condition (for example, a low signal-to-noise ratio), a probability that a false positive error occurs in bits carried in the L-SIG field increases, resulting in that the receive end cannot acquire correct length information or the like, and possibly cannot receive or send a valid frame within a period of time, which greatly reduces a throughput rate of a system, and severely affects data transmission performance and user experience.

Therefore, it is intended to provide a technology that can improve a throughput rate of a system, and improve data transmission performance and user experience.

SUMMARY

Embodiments of the present invention provide a data transmission method and apparatus, which can improve a throughput rate of a system, and improve data transmission performance and user experience.

According to a first aspect, a data transmission method is provided, where the method includes: determining, by a transmit end device and based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end; and adding the target bit sequence to length bits that are in a legacy signal field of a target preamble, performing transmit power enhancement processing on a legacy short training field, a legacy long training field, and the legacy signal field that are in the target preamble according to the transmit power amplification limit, and sending the target preamble to the receive end, where the target preamble and the target data are carried in a same data frame.

With reference to the first aspect, in a first implementation manner of the first aspect, the determining, by a transmit end device and based on a preset rule and a system state, a target bit sequence according to a data length of target data sent to a receive end includes: determining, by the transmit end, a mapping entry according to the preset rule, where a mapping relationship between N data lengths and N bit sequences is recorded in the mapping entry, there is a one-to-one correspondence between the N data lengths and the N bit sequences, and the data length of the target data belongs to the N data lengths; determining, according to the system state, PAPRs respectively corresponding to the N bit sequences; determining at least one bit sequence pair according to a preset threshold, where one bit sequence pair includes one to-be-modified bit sequence and one reference bit sequence, the to-be-modified bit sequences included in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end; modifying the mapping entry according to the bit sequence pair, so as to replace the to-be-modified bit sequence in each bit sequence pair with the reference bit sequence; and searching for the modified mapping entry according to the data length of the target data sent to the receive end, so as to determine the target bit sequence.

With reference to the first aspect and the foregoing implementation manner of the first aspect, in a second implementation manner of the first aspect, if the to-be-modified bit sequence in one bit sequence pair has at least two candidate bit sequences among the N bit sequences, the reference bit sequence is a bit sequence whose corresponding data length is the minimum of the at least two candidate bit sequences, where a PAPR corresponding to the candidate bit sequence is less than or equal to the preset threshold, and the data length corresponding to the to-be-modified bit sequence is less than a data length corresponding to the candidate bit sequence.

With reference to the first aspect and the foregoing implementation manners of the first aspect, in a third implementation manner of the first aspect, the determining, by a transmit end device and based on a preset rule and a system state, a target bit sequence according to a data length of target data sent to a receive end includes: determining, by the transmit end according to the preset rule, a first bit sequence that corresponds to the data length of the target data sent to the receive end; and determining the target bit sequence from at least one second bit sequence, where in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

With reference to the first aspect and the foregoing implementation manners of the first aspect, in a fourth implementation manner of the first aspect, before the determining the target bit sequence from at least one second bit sequence, the method further includes: determining that the PAPR corresponding to the first bit sequence is greater than a preset threshold, where the preset threshold is less than the power amplification limit of the transmit end, and the PAPR corresponding to the second bit sequence is less than or equal to the preset threshold.

With reference to the first aspect and the foregoing implementation manners of the first aspect, in a fifth implementation manner of the first aspect, when there are at least two second bit sequences, the target bit sequence is a bit sequence whose corresponding data length is the minimum of the at least two second bit sequences.

With reference to the first aspect and the foregoing implementation manners of the first aspect, in a sixth implementation manner of the first aspect, the performing transmit power enhancement processing on a legacy short training field, a legacy long training field, and the legacy signal field that are in the target preamble according to the transmit power amplification limit includes: performing transmit power enhancement processing on the legacy short training field, the legacy long training field, and the legacy signal field that are in the target preamble according to the PAPR corresponding to the target bit sequence and the transmit power amplification limit.

With reference to the first aspect and the foregoing implementation manners of the first aspect, in a seventh implementation manner of the first aspect, the performing transmit power enhancement processing on a legacy short training field, a legacy long training field, and the legacy signal field that are in the target preamble according to the transmit power amplification limit includes: performing transmit power enhancement processing on the legacy short training field, the legacy long training field, and the legacy signal field that are in the target preamble according to the preset threshold and the transmit power amplification limit.

According to a second aspect, a data transmission apparatus is provided, where the apparatus includes: a determining unit, configured to determine, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end; and a processing unit, configured to add the target bit sequence to length bits that are in a legacy signal field of a target preamble, perform transmit power enhancement processing on a legacy short training field, a legacy long training field, and the legacy signal field that are in the target preamble according to the transmit power amplification limit, and send the target preamble to the receive end, where the target preamble and the target data are carried in a same data frame.

With reference to the second aspect, in a first implementation manner of the first aspect, the determining unit is specifically configured to determine a mapping entry according to the preset rule, where a mapping relationship between N data lengths and N bit sequences is recorded in the mapping entry, there is a one-to-one correspondence between the N data lengths and the N bit sequences, and the data length of the target data belongs to the N data lengths; configured to determine, according to the system state, PAPRs respectively corresponding to the N bit sequences; configured to determine at least one bit sequence pair according to a preset threshold, where one bit sequence pair includes one to-be-modified bit sequence and one reference bit sequence, the to-be-modified bit sequences included in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end; configured to modify the mapping entry according to the bit sequence pair, so as to replace the to-be-modified bit sequence in each bit sequence pair with the reference bit sequence; and configured to search for the modified mapping entry according to the data length of the target data sent to the receive end, so as to determine the target bit sequence.

With reference to the second aspect and the foregoing implementation manner of the second aspect, in a second implementation manner of the first aspect, if the to-be-modified bit sequence in one bit sequence pair has at least two candidate bit sequences among the N bit sequences, the reference bit sequence determined by the determining unit is a bit sequence whose corresponding data length is the minimum of the at least two candidate bit sequences, where a PAPR corresponding to the candidate bit sequence is less than or equal to the preset threshold, and the data length corresponding to the to-be-modified bit sequence is less than a data length corresponding to the candidate bit sequence.

With reference to the second aspect and the foregoing implementation manners of the second aspect, in a third implementation manner of the first aspect, the determining unit is specifically configured to determine, according to the preset rule, a first bit sequence that corresponds to the data length of the target data sent to the receive end; and configured to determine the target bit sequence from at least one second bit sequence, where in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

With reference to the second aspect and the foregoing implementation manners of the second aspect, in a fourth implementation manner of the first aspect, the determining unit is further configured to determine that the PAPR corresponding to the first bit sequence is greater than a preset threshold, where the preset threshold is less than the power amplification limit of the transmit end, and the PAPR corresponding to the second bit sequence is less than or equal to the preset threshold.

With reference to the second aspect and the foregoing implementation manners of the second aspect, in a fifth implementation manner of the first aspect, when there are at least two second bit sequences, the target bit sequence determined by the determining unit is a bit sequence whose corresponding data length is the minimum of the at least two second bit sequences.

With reference to the second aspect and the foregoing implementation manners of the second aspect, in a sixth implementation manner of the first aspect, the processing unit is specifically configured to perform transmit power enhancement processing on the legacy short training field, the legacy long training field, and the legacy signal field that are in the target preamble according to the PAPR corresponding to the target bit sequence and the transmit power amplification limit.

With reference to the second aspect and the foregoing implementation manners of the second aspect, in a seventh implementation manner of the first aspect, the processing unit is specifically configured to perform transmit power enhancement processing on the legacy short training field, the legacy long training field, and the legacy signal field that are in the target preamble according to the preset threshold and the transmit power amplification limit.

According to the data transmission method and apparatus that are in the embodiments of the present invention, a transmit end replaces a bit sequence that corresponds to a data length of target data needing to be transmitted to the transmit end with a bit sequence having a longer corresponding data length and a lower PAPR, and adds the bit sequence to an L-SIG field of a preamble, which can effectively reduce a PAPR of the L-SIG field, so that the PAPR of the L-SIG field is in a linear range of a power amplifier, and the preamble can be sent to a receive end after transmit power amplification is performed on the preamble, thereby improving an effect of obtaining accurate length information by the receive end. Because the data length that corresponds to the bit sequence carried in the L-SIG field is greater than the data length of the actually sent data, it can be ensured that a transmission process is not interfered, and accuracy of transmission can be ensured, so that a throughput rate of a system can be improved, and data transmission performance and user experience can be improved.

BRIEF DESCRIPTION OF DRAWINGS

FIG. 1 is a schematic diagram of a structure of a preamble in the prior art;

FIG. 2 is a schematic flowchart of a data transmission method according to an embodiment of the present invention;

DESCRIPTION OF EMBODIMENTS

Figure 3:
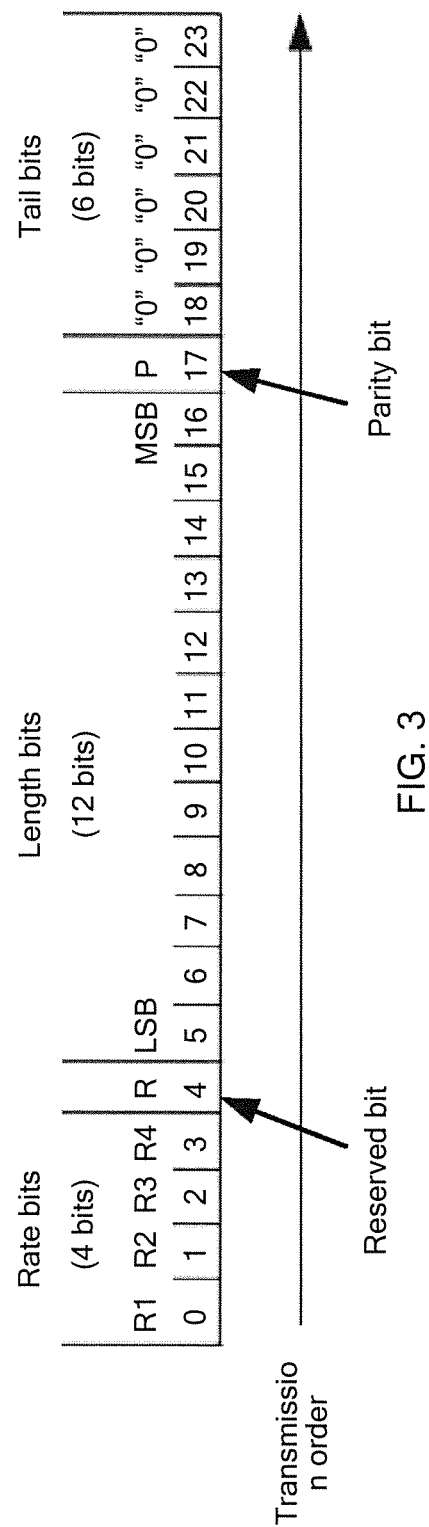
FIG. 3 is a schematic diagram of an example of bit allocation in an L-SIG field.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems that need to notify, by using a preamble, a communications peer end of information such as a data rate and a data length that are of transmitted data, for example, a wireless local area network (WLAN, Wireless Local Area Network) system, and a Wireless Fidelity (WiFi, Wireless Fidelity) system.

Correspondingly, a transmit end may be a subscriber station (STA, Station) in a WLAN. The subscriber station may also be referred to as a system, a subscriber unit, an access terminal, a mobile station, a mobile console, a remote station, a remote terminal, a mobile device, a user terminal, a terminal, a wireless communications device, a user agent, a user apparatus, or UE (User Equipment, user equipment). The STA may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless local area network (for example, WiFi) communication function, a computing device, or another processing device connected to a wireless modem.

In addition, a transmit end may also be an access point (AP, Access Point) in a WLAN, and the access point may be configured to communicate with an access terminal by means of a wireless local area network, and transmit data of the access terminal to a network side or transmit data from a network side to the access terminal.

In the following, for ease of understanding and description, as an example but not a limitation, execution processes and actions of a data transmission method and apparatus of the present invention in the WiFi system are described.

In addition, aspects or features of the present invention may be implemented as a method, an apparatus or a product that uses standard programming and/or engineering technologies. The term "product" used in this application covers a computer program that can be accessed from any computer-readable device, carrier or medium. For example, a computer-readable medium may include, but is not limited to: a magnetic storage device (such as a hard disk, a floppy disk, or a magnetic tape), an optical disc (such as a CD (Compact Disk, compact disk), or a DVD (Digital Versatile Disk, digital versatile disc)), a smartcard and a flash memory device (such as an EPROM (Erasable Programmable Read-Only Memory, erasable programmable read-only memory), a card, a stick, or a key drive). In addition, various storage media described in this specification may indicate one or more devices and/or other machine-readable media that are used to store information. The term "machine-readable media" may include but is not limited to a radio channel, and various other media that can store, contain, and/or carry an instruction and/or data.

In the prior art, length bits in an L-SIG field generally have 12 bits, to represent $2^{12}$ data lengths by using a $2^{12}$-digit binary string. Therefore, there may be multiple continuous bits in the L-SIG field that have repeated data, resulting in that a peak-to-average power ratio (PAPR, Peak-to-Average Power Ratio) of the L-SIG field is relatively high. Due to a limitation of a linear range of a power amplifier, a manner of improving a transmit power of the L-SIG field possibly cannot be used to deal with a situation in which the foregoing transmission condition is poor. If only transmit powers of an L-STF field and an L-LTF field are enhanced, setting of an AGC device is caused to be incorrect, resulting in that the L-SIG cannot be decoded correctly, and interoperability is lost.

FIG. 2 is a schematic flowchart of a data transmission method 100 according to an embodiment of the present invention. As shown in FIG. 2, the method 100 includes:

S110: A transmit end device determines, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end.

S120: Add the target bit sequence to length bits that are in a legacy signal field of a target preamble, perform transmit power enhancement processing on a legacy short training field, a legacy long training field, and the legacy signal field that are in the target preamble, and send the target preamble to the receive end, where the target preamble and the target data are carried in a same data frame.

In the prior art, the L-SIG field is mainly used to carry data rate information and data length information, so that the receive end device can determine a length of data according to the data rate information and the data length information, where the data and the preamble are carried in a same frame, so as to determine an appropriate time to remain idle.

FIG. 3 shows an example of bit allocation in an L-SIG field according to an embodiment of the present invention. In the example shown in FIG. 3, the L-SIG field includes rate bits, a reserved bit, length bits, a parity bit, and tail bits, where:

the rate bits are used to indicate a transmission rate, and may have four bits to carry four bits, so as to identify $2^4$ rates;

the 1-bit reserved bit is generally set to zero;

the length bits are used to indicate a data length or a valid payload length, and may have 12 bits to carry 12 bits, so as to identify $2^{12}$ data lengths;

the parity bit is used to carry a parity bit, where the parity bit may include one bit, as a check value of previous 17 bits; and the 6-bit tail bits are used to clear a coder and a decoder and are generally set to 000000.

It should be understood that the bit allocation manner described above of the L-SIG field is merely exemplary, and the present invention is not limited thereto. Composition and lengths of the composition units of the L-SIG field, for example, a length of the length bits, can be changed arbitrarily.

Generally, because lengths of data vary, multiple bits need to be allocated to length bits to increase types of lengths that can be represented by the length bits. For example, as described above, the length bits have 12 bits, to represent $2^{12}$ data lengths by using a $2^{12}$-digit binary string.

Therefore, there may be multiple continuous bits in the L-SIG field (specifically, the length bits) that have repeated data, resulting in that a PAPR of the L-SIG field is relatively high. Due to a limitation of a non-linear range of a power amplifier, the relatively high PAPR may result in that a manner of improving a transmit power of the L-SIG field cannot be used to deal with a situation in which the foregoing transmission condition is poor.

Correspondingly, in this embodiment of the present invention, a transmit end replaces a bit sequence that corresponds to a data length of target data needing to be transmitted to the transmit end with a target bit sequence having a longer corresponding data length and a lower PAPR, and adds the target bit sequence to an L-SIG field (specifically, length bits) of a preamble, which can effectively reduce a PAPR of the L-SIG field, so that the preamble can be sent to a receive end after transmit power amplification is performed on the preamble, thereby improving an effect of obtaining accurate length information by the receive end. Because the data length that corresponds to the bit sequence carried in the L-SIG field is greater than the data length of the actually sent data, it can be ensured that a transmission process is not interfered, and accuracy of transmission can be ensured, so that a throughput rate of a system can be improved, and data transmission performance and user experience can be improved.

In this embodiment of the present invention, two manners of determining the foregoing target bit sequence are provided, that is, a manner 1 and a manner 2. The following separately describes the foregoing two manners in detail.

Manner 1

Optionally, the determining, by a transmit end device and based on a preset rule and a system state, a target bit sequence according to a data length of target data sent to a receive end includes:

determining, by the transmit end, a mapping entry according to the preset rule, where a mapping relationship between N data lengths and N bit sequences is recorded in the mapping entry, there is a one-to-one correspondence between the N data lengths and the N bit sequences, and the data length of the target data belongs to the N data lengths;

determining, according to the system state, PAPRs respectively corresponding to the N bit sequences;

determining at least one bit sequence pair according to a preset threshold, where one bit sequence pair includes one to-be-modified bit sequence and one reference bit sequence, the to-be-modified bit sequences included in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end;

modifying the mapping entry according to the bit sequence pair, so as to replace the to-be-modified bit sequence in each bit sequence pair with the reference bit sequence; and searching for the modified mapping entry according to the data length of the target data sent to the receive end, so as to determine the target bit sequence.

Specifically, data lengths represented by binary strings (that is, bit sequences) (that is, a mapping relationship between the binary strings and the data lengths) may be negotiated at the transmit end and the receive end.

For example, at the transmit end and the receive end, Table 1 in which the mapping relationship between the binary strings (that is, the bit sequences) and the data lengths is recorded may be formed based on a same preset rule. To avoid repeated descriptions, and without loss of generality, Table 1 shows only a mapping relationship between a part of the data lengths and a part of the binary strings.

TABLE 1

(an example of a mapping entry)

| Data length | Binary string (12 bits) carried in length bits of an L-SIG field | | | |
|---|---|---|---|---|
| ... | ... | ... | ... | ... |
| 403 | 110 | 010 | 011 | 000 |
| 404 | 001 | 010 | 011 | 000 |
| 405 | 101 | 010 | 011 | 000 |
| 406 | 011 | 010 | 011 | 000 |
| ... | ... | ... | ... | ... |
| 443 | 110 | 111 | 011 | 000 |
| 444 | 001 | 111 | 011 | 000 |
| 445 | 101 | 111 | 011 | 000 |
| ... | ... | ... | ... | ... |

Thereafter, PAPRs corresponding to the binary strings (that is, the bit sequences) may be determined based on the system state (such as a system configuration parameter). In this embodiment of the present invention, a PAPR corresponding to a bit sequence refers to a PAPR of an L-SIG field whose length bits carry the bit sequence. In this embodiment of the present invention, a process and a method for determining, based on the system state, the PAPRs that correspond to the bit sequences may be similar to those in the prior art. Here, to avoid repeated descriptions, detailed descriptions thereof are omitted.

It should be noted that a unit of the data length in the foregoing Table 1 may be determined arbitrarily, and may be, for example, bytes (Byte) or bits (Bit), which is not specially limited in the present invention.

The following Table 2 shows the foregoing determined PAPRs of the bit sequences in Table 1.

TABLE 2

(another example of a mapping entry)

| Data length | Binary string (12 bits) carried in length bits of an L-SIG field | | | | PAPR (dB) of the L-SIG field |
|---|---|---|---|---|---|
| ... | ... | ... | ... | ... | ... |
| 403 | 110 | 010 | 011 | 000 | 8.3056 |
| 404 | 001 | 010 | 011 | 000 | 4.4896 |
| 405 | 101 | 010 | 011 | 000 | 7.3815 |
| 406 | 011 | 010 | 011 | 000 | 6.9734 |
| ... | ... | ... | ... | ... | ... |
| 443 | 110 | 111 | 011 | 000 | 5.4535 |
| 444 | 001 | 111 | 011 | 000 | 5.6522 |
| 445 | 101 | 111 | 011 | 000 | 4.8945 |
| ... | ... | ... | ... | ... | ... |

Moreover, in this embodiment of the present invention, the transmit end may determine the transmit power amplification limit.

Optionally, the transmit power amplification limit is determined according to a maximum output power of a power amplifier used by the transmit end.

Specifically, the power amplifier generally has a linear range. In the linear range, a ratio of an output power to an input power increases linearly. However, a power amplification effect decreases obviously when the input power exceeds a particular threshold, and if the input power continues to increase, the output power remains unchanged. That is, the power amplifier has a maximum output power (which is represented as $P_{max}$), and when the input power is greater than the maximum output power, a power amplification effect without power distortion cannot be achieved. In this embodiment of the present invention, as an example but not a limitation, the foregoing transmit power amplification limit may be determined according to the foregoing maximum output power.

For example, for one selected reference bit sequence, assuming that before the reference bit sequence enters the power amplifier, an average power of the reference bit sequence is $P_1$, and a peak power is $P_2$, a PAPR (which is represented as β) of the reference bit sequence may be represented as $β=P_2/P_1$, that is:

$$P_2 = P_1 \cdot β \quad (1)$$

Assuming that an amplification factor of the power amplifier is x, an average transmit power of a signal that is amplified by the power amplifier is $P_1 \cdot x$. Moreover, in a communications system, an average transmit power of a signal should satisfy a prescribed standard, that is, be less than or equal to a maximum average transmit power $P_{standard}$ prescribed in the standard. Generally, a signal is transmitted at a full power, that is:

$$P_1 \cdot x = P_{standard} \quad (2)$$

According to the foregoing limitation of the power amplifier, it needs to satisfy:

$$P_2 \cdot x < P_{max} \quad (3)$$

Therefore, it may be obtained from the formulas (1), (2), and (3) that $β < P_{max}/P_{standard}$. Therefore, the transmit end may determine the foregoing transmit power amplification limit according to the maximum output power of the power amplifier of the transmit end and the maximum average transmit power of a signal. For example, a value of $P_{max}/P_{standard}$ may be used as the foregoing transmit power amplification limit, and generally, the transmit power amplification limit may be, for example, 8 dB.

It should be understood that a determining method and a value of the foregoing transmit power amplification limit are merely exemplary, and the present invention is not limited thereto. For example, the value of the foregoing transmit power amplification limit may also be less than the value of $P_{max}/P_{standard}$ or greater than the value of $P_{max}/P_{standard}$, which is not specially limited in the present invention.

Thereafter, the transmit end may determine a threshold (that is, the preset threshold) less than the transmit power amplification limit, and replace a bit sequence (that is, the to-be-modified bit sequence in one bit sequence pair) in Table 1 whose corresponding PAPR is greater than the preset threshold.

For example, if the determined preset threshold is 5 dB, Table 2 may be searched for a bit sequence whose corresponding PAPR is greater than 5 dB. For example, a PAPR of a corresponding bit sequence (which is referred to as a bit sequence 1 for short below) when the data length is 403 is 8.3056 dB, and is greater than the preset threshold.

Thereafter, a bit sequence whose corresponding data length is greater than 403 and whose PAPR is less than or equal to the preset threshold may be searched for. As shown in Table 2, bit sequences satisfying the foregoing condition are: a corresponding bit sequence (which is referred to as a bit sequence 2 for short below) when the data length is 404 and a corresponding bit sequence (which is referred to as a bit sequence 3 for short below) when the data length is 445.

In this embodiment of the present invention, the bit sequence 1 and the bit sequence 2 may constitute a bit sequence pair, so that the bit sequence 2 may be used as a reference bit sequence for the bit sequence 1; or the bit sequence 1 and the bit sequence 3 may constitute a bit sequence pair, so that the bit sequence 3 may be used as a reference bit sequence for the bit sequence 1.

That is, in this embodiment of the present invention, when, there are multiple bit sequences B (whose PAPR is less than or equal to the preset threshold and whose corresponding data length is greater than that of the bit sequence A) for a bit sequence A whose PAPR is greater than the foregoing preset threshold, any bit sequence $B_1$ may be selected from the multiple bit sequences B, to constitute a bit sequence pair together with the bit sequence A, where the bit sequence A is used as a to-be-modified bit sequence, and the selected bit sequence $B_1$ is used as a reference bit sequence.

Optionally, if the to-be-modified bit sequence in one bit sequence pair has at least two candidate bit sequences among the N bit sequences, the reference bit sequence is a bit sequence whose corresponding data length is the minimum of the at least two candidate bit sequences, where a PAPR corresponding to the candidate bit sequence is less than or equal to the preset threshold, and the data length corresponding to the to-be-modified bit sequence is less than a data length corresponding to the candidate bit sequence.

Specifically, as described above, when there are multiple bit sequences B for a bit sequence A, a bit sequence (which is represented as a bit sequence $B_{min}$) whose corresponding data length is minimum may be selected to constitute a bit sequence pair with the bit sequence A, where the bit sequence A is used as a to-be-modified bit sequence, and the selected bit sequence $B_{min}$ is used as a reference bit sequence.

Because the data length corresponding to the selected bit sequence $B_{min}$ is minimum among the multiple bit sequences B, after the bit sequence $B_{min}$ is carried in the length bits of the legacy signal field and is sent to the receive end, which is described subsequently, the receive end can determine that a time to remain idle (or to be in use) is closest to a time that is needed to actually obtain the data, so that a throughput of a system is improved.

In the foregoing manner, reference bit sequences that respectively correspond to all to-be-modified bit sequences whose PAPRs are greater than the preset threshold can be determined.

Moreover, the to-be-modified bit sequences in Table 2 may be replaced with the reference bit sequences corresponding to the to-be-modified bit sequences. The following Table 3 is formed after the foregoing modification is made to Table 2.

TABLE 3

(an example of a modified mapping entry)

| Data length | Binary string (12 bits) carried in length bits of an L-SIG field | | | | PAPR (dB) of the L-SIG field |
|---|---|---|---|---|---|
| . . . | . . . | . . . | . . . | . . . | . . . |
| 403 | 001 | 010 | 011 | 000 | 4.4896 |
| 404 | 001 | 010 | 011 | 000 | 4.4896 |
| 405 | 101 | 111 | 011 | 000 | 4.8945 |
| 406 | 101 | 111 | 011 | 000 | 4.8945 |
| . . . | . . . | . . . | . . . | . . . | . . . |
| 443 | 101 | 111 | 011 | 000 | 4.8945 |
| 444 | 101 | 111 | 011 | 000 | 4.8945 |
| 445 | 101 | 111 | 011 | 000 | 4.8945 |
| . . . | . . . | . . . | . . . | . . . | . . . |

As shown in Table 3, data lengths that correspond to the bit sequences after the foregoing modification are all greater than or equal to the data lengths that correspond to the bit sequences in Table 1, or after the receive end identifies the bit sequence, the data length that corresponds to the bit and that is identified according to Table 1 is greater than a length of data that is actually sent at the transmit end of the bit sequence, so that normal transmission of data can be ensured.

Thereafter, when the transmit end needs to send data, the transmit end may search the foregoing Table 3 (or a table that is formed by removing a column of PAPR values from Table 3) based on a data length of the data, to acquire a bit sequence that is carried in the length bits of the L-SIG field. For example, if a length of data needing to be sent is 403, a bit sequence 001010011000 is selected, and the bit sequence 001010011000 is carried in the length bits of the L-SIG field.

Therefore, a PAPR of an L-SIG field generated according to the foregoing Table 3 is 4.4896 dB, which is less than the preset threshold (5 dB), and is also less than a PAPR (8.3056 dB) of an L-SIG field generated according to Table 1.

Thereafter, power enhancement may be simultaneously performed on a legacy part (that is, the L-STF field, the L-LTF field, and the L-SIG field) of the preamble (that is, the target preamble) in a baseband.

Specifically, for example, when a system bandwidth is 20 MHz, a PAPR of the L-STF field is generally 2.3 dB, and a PAPR of the L-LTF field is generally 2.4 dB, which are far less than the PAPR of the L-SIG field. Therefore, the power enhancement may be performed on the legacy part of the preamble on a basis of the PAPR of the L-SIG field and based on the foregoing transmit power amplification limit (for example, a maximum input power of the linear range of the used power amplifier).

In this embodiment of the present invention, the foregoing power enhancement may be performed based on the preset threshold (that is, a case A), or the foregoing power enhancement may be performed based on a PAPR (that is, the PAPR corresponding to the target bit sequence) of the L-SIG field (that is, a case B), where the PAPR is determined according to the foregoing Table 3 and corresponds to a length of data needing to be sent. The following separately describes the foregoing two cases, and for ease of understanding, as an example but not a limitation, an enhancement method when the system bandwidth is 20 MHz is used as an example for description.

Case A

Optionally, the performing transmit power enhancement processing on the preamble and sending the preamble to the receive end includes:

performing transmit power enhancement processing on the preamble according to the preset threshold and the transmit power amplification limit and sending the preamble to the receive end.

Specifically, if the foregoing determined transmit power amplification limit is 8 dB, and the foregoing preset threshold is 5 dB, to ensure that power amplification is in the linear range of the power amplifier, or to achieve a power amplification effect without power distortion, the legacy part of the target preamble may be enhanced in the baseband by 8 dB−5 dB=3 dB.

The following formula 1 is used to enhance the L-SIG field:

$$r_{L-SIG}^{(i_{seg}, i_{TX})}(t) =$$

-continued $$\frac{\alpha}{\sqrt{N_{L-SIG}^{Tone}N_{TX}}}w_{T_{L-SIG}}(t) \cdot \sum_{i_{BW}=0}^{N_{20\,MHz}-1} \sum_{k=-26}^{26} (\gamma_{(k-K_{shift}(i_{BW})),BW}(D_{k,20} +$$

$$p_0P_k) \cdot \exp(j2\pi(k-K_{shift}(i_{BW}))\Delta_F(t-T_{GI}-T_{CS}^{iTX})),$$

where parameters in the formula 1 have the following meanings:
$T_{CS}^{iTX}$ a value of a cyclic delay, and $T_{GI}$ represents a value of a guard interval; and $K_{Shift}(i)=(N_{20MHz}-1-2i)\cdot 32$, where $\gamma_{k,BW}$ is a value of frequency domain rotation, $N_{TX}$ is a quantity of transmit antennas at the transmit end, $N^{Tone}$ is a quantity of subcarriers used at the transmit end, and $w_T(t)$ is a time domain window function.

In this embodiment of the present invention, a represents a transmit power enhancement factor, and may be determined according to a difference between the foregoing determined transmit power amplification limit and the foregoing preset threshold, that is, $$\alpha = 10^{\frac{X-Y}{10}},$$

where X represents the transmit power amplification limit, and Y represents the preset threshold.

It should be understood that a method described above for performing transmit power enhancement (that is, for determining the transmit power enhancement factor α) according to the preset threshold and the transmit power amplification limit is merely exemplary, and the present invention is not limited thereto. For example, X may also be less than the transmit power amplification limit, or Y may also be greater than the preset threshold.

In addition, an implementation method when the bandwidth is 20 MHz is described above. When the system bandwidth changes, a parameter $N_{20MHz}$ may be adjusted according to a used system bandwidth, and a remaining process may be similar to the foregoing process.

Moreover, the following formula 2 may be used to enhance the L-STF field:

$$r_{L-STF}^{(iseg,iTX)}(t) =$$

$$\frac{\alpha}{\sqrt{N_{L-STF}^{Tone}N_{TX}}}w_{T_{L-STF}}(t) \cdot \sum_{k=-N_{SR}}^{N_{SR}} (\gamma_{k,BW}S_k \cdot \exp(j2\pi k\Delta_F(t-T_{CS}^{iTX})))$$

Moreover, the following formula 3 may be used to enhance the L-LTF field:

$$r_{L-STF}^{(iseg,iTX)}(t) =$$

$$\frac{\alpha}{\sqrt{N_{L-STF}^{Tone}N_{TX}}}w_{T_{L-STF}}(t) \cdot \sum_{k=-N_{SR}}^{N_{SR}} (\gamma_{k,BW}S_k \cdot \exp(j2\pi k\Delta_F(t-T_{CS}^{iTX})))$$

Parameters used in the formula 2 and the formula 3 are similar to those in the formula 1, and repeated descriptions are omitted here to avoid the repeated descriptions.

As described above, after power enhancement is performed on the legacy part of the preamble in the baseband, common signal processing such as up-conversion processing may be performed on an enhanced baseband signal, and the enhanced baseband signal is sent to the power amplifier of the transmit end. Because a power of the signal on which the foregoing power enhancement processing has been performed is in the linear range of the power amplifier, a relatively desirable power amplification effect can be obtained.

Case B

Optionally, the performing transmit power enhancement processing on the preamble and sending the preamble to the receive end includes:

performing transmit power enhancement processing on the preamble according to the PAPR corresponding to the target bit sequence and the transmit power amplification limit, and according to the PAPR corresponding to the target bit sequence.

Specifically, if the foregoing determined transmit power amplification limit is 8 dB, and the PAPR corresponding to the foregoing target bit sequence is 4.4896 dB, to ensure that power amplification is in the linear range of the power amplifier, the legacy part of the target preamble may be enhanced in the baseband by 8 dB−4.4896 dB=3.5104 dB.

Therefore, the power enhancement may be simultaneously performed on the L-STF field, the L-LTF field, and the L-SIG field according to the foregoing formula 1 to the foregoing formula 3. It should be noted that in this case, a represents a transmit power enhancement factor, and may be determined according to the foregoing determined transmit power amplification limit and the PAPR corresponding to the foregoing target bit sequence, that is, $$\alpha = 10^{\frac{X-Y}{10}},$$

where X represents the transmit power amplification limit, and Y represents the PAPR corresponding to the target bit sequence.

An implementation manner in which the preset threshold is 5 dB is described above, but the present invention is not limited thereto. The preset threshold may be determined arbitrarily, as long as the preset threshold is less than the transmit power amplification limit.

It should be understood that a method described above for performing transmit power enhancement (that is, for determining the transmit power enhancement factor α) according to the PAPR corresponding to the target bit sequence and the transmit power amplification limit is merely exemplary, and the present invention is not limited thereto. For example, X may also be less than the transmit power amplification limit, or Y may also be greater than the PAPR corresponding to the target bit sequence.

For example, the preset threshold may also be set to 5.5 dB. In this case, Table 2 may be searched for a bit sequence whose corresponding PAPR is greater than 5.5 dB. For example, a PAPR of a corresponding bit sequence (which is referred to as a bit sequence 1 for short below) when the data length is 403 is 8.3056 dB, and is greater than the preset threshold.

Thereafter, a bit sequence whose corresponding data length is greater than 403 and whose PAPR is less than or equal to the preset threshold may be searched for. As shown in Table 2, bit sequences satisfying the foregoing condition are: a corresponding bit sequence (which is referred to as a bit sequence 2 for short below) when the data length is 404, a corresponding bit sequence (which is referred to as a bit sequence 4 for short below) when the data length is 443, and a corresponding bit sequence (which is referred to as a bit sequence 3 for short below) when the data length is 445.

In this embodiment of the present invention, the bit sequence 1 and the bit sequence 2 may constitute a bit sequence pair, so that the bit sequence 2 may be used as a reference bit sequence for the bit sequence 1. Alternatively, the bit sequence 1 and the bit sequence 3 may constitute a bit sequence pair, so that the bit sequence 3 may be used as a reference bit sequence for the bit sequence 1. Alternatively, the bit sequence 1 and the bit sequence 4 may constitute a bit sequence pair, so that the bit sequence 4 may be used as a reference bit sequence for the bit sequence 1.

For example, the bit sequence 2 whose corresponding data length is minimum in the bit sequences 2 to 5 may be selected as a reference sequence of the bit sequence 1.

In the foregoing manner, reference bit sequences that respectively correspond to all to-be-modified bit sequences whose PAPRs are greater than the preset threshold can be determined.

Moreover, the to-be-modified bit sequences in Table 2 may be replaced with the reference bit sequences corresponding to the to-be-modified bit sequences. The following Table 4 is formed after the foregoing modification is made to Table 2.

TABLE 4

(another example of a modified mapping entry)

| Data length | Binary string (12 bits) carried in length bits of an L-SIG field | | | | PAPR (dB) of the L-SIG field |
|---|---|---|---|---|---|
| ... | ... | ... | ... | ... | ... |
| 403 | 001 | 010 | 011 | 000 | 4.4896 |
| 404 | 001 | 010 | 011 | 000 | 4.4896 |
| 405 | 110 | 111 | 011 | 000 | 5.4535 |
| 406 | 110 | 111 | 011 | 000 | 5.4535 |
| ... | ... | ... | ... | ... | ... |
| 443 | 110 | 111 | 011 | 000 | 5.4535 |
| 444 | 101 | 111 | 011 | 000 | 4.8945 |
| 445 | 101 | 111 | 011 | 000 | 4.8945 |
| ... | ... | ... | ... | ... | ... |

As shown in Table 4, data lengths that correspond to the bit sequences after the foregoing modification are all greater than or equal to the data lengths that correspond to the bit sequences in Table 1, or after the receive end identifies the bit sequence, the data length that corresponds to the bit and that is identified according to Table 1 is greater than a length of data that is actually sent at the transmit end of the bit sequence, so that normal transmission of data can be ensured.

Thereafter, when the transmit end needs to send data, the transmit end may search the foregoing Table 3 (or a table that is formed by removing a column of PAPR values from Table 3) based on a data length of the data, to acquire a bit sequence that is carried in the length bits of the L-SIG field. For example, if a length of data needing to be sent is 403, a bit sequence 001010011000 is selected, and the bit sequence 001010011000 is carried in the length bits of the L-SIG field.

Therefore, a PAPR of an L-SIG field generated according to the foregoing Table 4 is 4.4896 dB, which is less than the preset threshold (5.5 dB), and is also less than a PAPR (8.3056 dB) of an L-SIG field generated according to Table 1.

Thereafter, power enhancement may be simultaneously performed on a legacy part (that is, the L-STF field, the L-LTF field, and the L-SIG field) of the preamble (that is, the target preamble) in a baseband by using the method described above.

Manner 2

Optionally, the determining, by a transmit end device and based on a preset rule and a system state, a target bit sequence according to a data length of target data sent to a receive end includes:

determining, by the transmit end according to the preset rule, a first bit sequence that corresponds to the data length of the target data sent to the receive end; and determining the target bit sequence from at least one second bit sequence, where in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

Specifically, data lengths represented by binary strings (that is, bit sequences) (that is, a mapping relationship between the binary strings and the data lengths) may be negotiated at the transmit end and the receive end.

For example, at the transmit end and the receive end, Table 1 in which the mapping relationship between the binary strings (that is, the bit sequences) and the data lengths is recorded may be formed based on a same preset rule.

Thereafter, PAPRs corresponding to the binary strings (that is, the bit sequences) may be determined based on the system state (such as a system configuration parameter). In this embodiment of the present invention, a PAPR corresponding to a bit sequence refers to a PAPR of an L-SIG field whose length bits carry the bit sequence. In this embodiment of the present invention, a process and a method for determining, based on the system state, the PAPRs that correspond to the bit sequences may be similar to those in the prior art. Here, to avoid repeated descriptions, detailed descriptions thereof are omitted.

Moreover, the foregoing Table 2 shows the foregoing determined PAPRs of the bit sequences in Table 1.

Moreover, in this embodiment of the present invention, the transmit end may determine the transmit power amplification limit.

Optionally, the transmit power amplification limit is determined according to a maximum output power of a power amplifier used by the transmit end.

Specifically, the power amplifier generally has a linear range. In the linear range, a ratio of an output power to an input power increases linearly. However, a power amplification effect decreases obviously when the input power exceeds a particular threshold, and if the input power continues to increase, the output power remains unchanged. That is, the power amplifier has a maximum output power (which is represented as $P_{max}$), and when the input power is greater than the maximum output power, a power amplification effect without power distortion cannot be achieved. In this embodiment of the present invention, as an example but not a limitation, the foregoing transmit power amplification limit may be determined according to the foregoing maximum output power.

For example, for one selected reference bit sequence, assuming that before the reference bit sequence enters the power amplifier, an average power of the reference bit sequence is $P_1$, and a peak power is $P_2$, a PAPR (which is represented as $\beta$) of the reference bit sequence may be represented as $\beta=P_2/P_1$, that is:

$$P_2 = P_1 \cdot \beta \quad (1)$$

Assuming that an amplification factor of the power amplifier is x, an average transmit power of a signal that is amplified by the power amplifier is $P_1 \cdot x$. Moreover, in a communications system, an average transmit power of a signal should satisfy a prescribed standard, that is, be less than or equal to a maximum average transmit power $P_{standard}$ prescribed in the standard. Generally, a signal is transmitted at a full power, that is:

$$P_1 \cdot x = P_{standard} \quad (2)$$

According to the foregoing limitation of the power amplifier, it needs to satisfy:

$$P_2 \cdot x < P_{max} \quad (3)$$

Therefore, it may be obtained from the formulas (1), (2), and (3) that $\beta < P_{max}/P_{standard}$. Therefore, the transmit end may determine the foregoing transmit power amplification limit according to the maximum output power of the power amplifier of the transmit end and the maximum average transmit power of a signal. For example, a value of $P_{max}/P_{standard}$ may be used as the foregoing transmit power amplification limit, and generally, the transmit power amplification limit may be, for example, 8 dB.

It should be understood that a determining method and a value of the foregoing transmit power amplification limit are merely exemplary, and the present invention is not limited thereto. For example, the value of the foregoing transmit power amplification limit may also be less than the value of $P_{max}/P_{standard}$ or greater than the value of $P_{max}/P_{standard}$, which is not specially limited in the present invention.

Thereafter, the transmit end may determine the data length of the target data needing to be sent to the receive end, search Table 1 based on the data length of the target data, determine the bit sequence (that is, the first bit sequence) corresponding to the data length of the target data, and further search Table 2, so as to determine the PAPR corresponding to the first bit sequence (that is, a PAPR of an L-SIG field whose length bits carry the first bit sequence).

Thereafter, the second bit sequence may be determined from Table 2. In this case, the PAPR corresponding to the target bit sequence is less than the PAPR corresponding to the first bit sequence, the data length corresponding to the second bit sequence is greater than the data length corresponding to the first bit sequence, and the PAPR corresponding to the second bit sequence is less than the foregoing transmit power amplification limit.

For example, when the data length of the target data is 403, there are six second bit sequences, that is, a corresponding bit sequence when the data length is 404 (where a corresponding PAPR is 4.4896 dB and is less than 8 dB), a corresponding bit sequence when the data length is 405 (where a corresponding PAPR is 7.3815 dB and is less than 8 dB), a corresponding bit sequence when the data length is 406 (where a corresponding PAPR is 6.9734 dB and is less than 8 dB), a corresponding bit sequence when the data length is 443 (where a corresponding PAPR is 5.4535 dB and is less than 8 dB), a corresponding bit sequence when the data length is 444 (where a corresponding PAPR is 5.6522 dB and is less than 8 dB), and a corresponding bit sequence when the data length is 445 (where a corresponding PAPR is 4.8945 dB and is less than 8 dB).

Therefore, the transmit end may select any bit sequence from the foregoing six second bit sequences as a target bit sequence, and add the target bit sequence to the length bits in the L-SIG field.

Optionally, when there are at least two second bit sequences, the target bit sequence is a bit sequence whose corresponding data length is the minimum of the at least two second bit sequences.

Specifically, as described above, when there are multiple bit sequences B for a bit sequence A, a bit sequence (which is represented as a bit sequence $B_{min}$) whose corresponding data length is minimum may be selected as a target bit sequence for the bit sequence A.

Because the data length corresponding to the selected bit sequence $B_{min}$ is minimum among the multiple bit sequences B, after the bit sequence $B_{min}$ is carried in the length bits of the legacy signal field and is sent to the receive end, which is described subsequently, the receive end can determine that a time to remain idle (or to be in use) is closest to a time that is needed to actually obtain the data, so that a throughput of a system is improved.

Therefore, the data length corresponding to the foregoing target bit sequence is greater than the data length of the target data, or after the receive end identifies the target bit sequence, a data length that corresponds to the target bit and that is identified according to Table 1 is greater than a length of data that is actually sent at the transmit end of the target bit sequence, so that normal transmission of data can be ensured.

For example, in a case in which the corresponding bit sequence when the data length is 404 is selected as a target bit sequence, a PAPR of a generated L-SIG field is 4.4896 dB, and is less than a PAPR (8.3056 dB) of an L-SIG field that is generated according to the target data and Table 1.

Thereafter, power enhancement may be simultaneously performed on a legacy part (that is, the L-STF field, the L-LTF field, and the L-SIG field) of the preamble (that is, the target preamble) in a baseband.

Specifically, when a system bandwidth is 20 MHz, a PAPR of the L-STF field is generally 2.3 dB, and a PAPR of the L-LTF field is generally 2.3 dB, which are far less than the PAPR of the L-SIG field. Therefore, the power enhancement may be performed on the legacy part of the preamble on a basis of the PAPR of the L-SIG field and based on the foregoing transmit power amplification limit (for example, a maximum input power of the linear range of the used power amplifier).

In this embodiment of the present invention, regardless of the data length of the target data, a target bit sequence can be selected for the target data. However, for example, when the PAPR of the bit sequence that corresponds to the data length of the target data is small enough, and the foregoing replacement is not needed (for example, when the data length of the target data is 404), performing of the foregoing step increases a burden of the transmit end. Therefore, in this embodiment of the present invention, the preset threshold may be set, and the foregoing method is performed according to the preset threshold, that is:

optionally, before the determining the target bit sequence from at least one second bit sequence, the method further includes:

determining that the PAPR corresponding to the first bit sequence is greater than a preset threshold, where the preset threshold is less than the power amplification limit of the transmit end, and the PAPR corresponding to the second bit sequence is less than or equal to the preset threshold.

Specifically, the transmit end may determine a threshold (that is, the preset threshold) that is less than the transmit power amplification limit, and search for the target bit sequence only when the PAPR of the bit sequence that corresponds to the data length of the target data is greater than the preset threshold; in this case, the PAPR corresponding to the target sequence needs to be less than the preset threshold.

For example, if the determined preset threshold is 5 dB, and when the data length of the target data is 403, where a PAPR of a bit sequence (which is referred to as a bit sequence 1 for short below) corresponding to the data length is 8.3056 dB and is greater than the preset threshold, a bit sequence whose corresponding data length is greater than 403 and whose PAPR is less than or equal to the preset threshold may be searched for. As shown in Table 2, bit sequences satisfying the foregoing condition are: a corresponding bit sequence (which is referred to as a bit sequence 2 for short below) when the data length is 404, and a corresponding bit sequence (which is referred to as a bit sequence 3 for short below) when the data length is 445.

In this embodiment of the present invention, the bit sequence 2 may be used as a target bit sequence for the bit sequence 1. Alternatively, the bit sequence 3 may be used as a target bit sequence for the bit sequence 1.

That is, in this embodiment of the present invention, when there are multiple bit sequences B (whose PAPR is less than or equal to the preset threshold and whose corresponding data length is greater than that of the bit sequence A) for a bit sequence A whose PAPR is greater than the foregoing preset threshold, any bit sequence $B_1$ may be selected from the multiple bit sequences B as a target bit sequence.

Optionally, when there are at least two second bit sequences, the target bit sequence is a bit sequence whose corresponding data length is the minimum of the at least two second bit sequences.

Specifically, as described above, when there are multiple bit sequences B for a bit sequence A, a bit sequence (which is represented as a bit sequence $B_{min}$) whose corresponding data length is minimum may be selected as a target bit sequence.

Because the data length corresponding to the selected bit sequence $B_{min}$ is minimum among the multiple bit sequences B, after the bit sequence $B_{min}$ is carried in the length bits of the legacy signal field and is sent to the receive end, which is described subsequently, the receive end can determine that a time to remain idle (or to be in use) is closest to a time that is needed to actually obtain the data, so that a throughput of a system is improved.

In this embodiment of the present invention, the foregoing power enhancement may be performed based on the preset threshold (that is, a case C), or the foregoing power enhancement may be performed based on the PAPR corresponding to the target bit sequence (that is, a case D). The following separately describes the foregoing two cases.

Case C

Optionally, the performing transmit power enhancement processing on the preamble and sending the preamble to the receive end includes:

performing transmit power enhancement processing on the preamble according to the preset threshold and the transmit power amplification limit and sending the preamble to the receive end.

Specifically, if the foregoing determined transmit power amplification limit is 8 dB, and the foregoing preset threshold is 5 dB, to ensure that power amplification is in the linear range of the power amplifier, the legacy part of the target preamble may be enhanced in the baseband by 8 dB−5 dB=3 dB.

For example, the L-SIG field may be enhanced according to the foregoing formula 1, and α in the formula 1 represents a transmit power enhancement factor, and may be determined according to a difference between the foregoing determined transmit power amplification limit and the foregoing preset threshold, that is, $$\alpha = 10^{\frac{X-Y}{10}},$$

where X represents the transmit power amplification limit, and Y represents the preset threshold.

It should be understood that a method described above for performing transmit power enhancement (that is, for determining the transmit power enhancement factor α) according to the preset threshold and the transmit power amplification limit is merely exemplary, and the present invention is not limited thereto. For example, X may also be less than the transmit power amplification limit, or Y may also be greater than the preset threshold.

Moreover, the L-STF field may be enhanced according to the foregoing formula 2.

Moreover, the L-LTF field may be enhanced according to the foregoing formula 3.

As described above, after power enhancement is performed on the legacy part of the preamble in the baseband, common signal processing such as up-conversion processing may be performed on an enhanced baseband signal, and the enhanced baseband signal is sent to the power amplifier of the transmit end. Because a power of the signal on which the foregoing power enhancement processing has been performed is in the linear range of the power amplifier, a relatively desirable power amplification effect can be obtained.

Case D

Optionally, the performing transmit power enhancement processing on the preamble and sending the preamble to the receive end includes:

performing transmit power enhancement processing on the preamble according to the PAPR corresponding to the target bit sequence and the transmit power amplification limit, and according to the PAPR corresponding to the target bit sequence.

Specifically, if the foregoing determined transmit power amplification limit is 8 dB, and the PAPR corresponding to the foregoing target bit sequence is 4.4896 dB, to ensure that power amplification is in the linear range of the power amplifier, the legacy part of the target preamble may be enhanced in the baseband by 8 dB−4.4896 dB=3.5104 dB.

Therefore, the power enhancement may be simultaneously performed on the L-STF field, the L-LTF field, and the L-SIG field according to the foregoing formula 1 to the foregoing formula 3. It should be noted that in this case, α represents a transmit power enhancement factor, and may be determined according to the foregoing determined transmit power amplification limit and the PAPR corresponding to the foregoing target bit sequence, that is, $$\alpha = 10^{\frac{X-Y}{10}},$$

where X represents the transmit power amplification limit, and Y represents the PAPR corresponding to the target bit sequence.

An implementation manner in which the preset threshold is 5 dB is described above, but the present invention is not limited thereto. The preset threshold may be determined arbitrarily, as long as the preset threshold is less than the transmit power amplification limit.

It should be understood that a method described above for performing transmit power enhancement (that is, for determining the transmit power enhancement factor α) according to the PAPR corresponding to the target bit sequence and the transmit power amplification limit is merely exemplary, and the present invention is not limited thereto. For example, X may also be less than the transmit power amplification limit, or Y may also be greater than the PAPR corresponding to the target bit sequence.

According to the data transmission method in this embodiment of the present invention, a transmit end replaces a bit sequence that corresponds to a data length of target data needing to be transmitted to the transmit end with a bit sequence having a longer corresponding data length and a lower PAPR, and adds the bit sequence to an L-SIG field of a preamble, which can effectively reduce a PAPR of the L-SIG field, so that the PAPR of the L-SIG field is in a linear range of a power amplifier, and the preamble can be sent to a receive end after transmit power amplification is performed on the preamble, thereby improving an effect of obtaining accurate length information by the receive end. Because the data length that corresponds to the bit sequence carried in the L-SIG field is greater than the data length of the actually sent data, it can be ensured that a transmission process is not interfered, and accuracy of transmission can be ensured, so that a throughput rate of a system can be improved, and data transmission performance and user experience can be improved.

The data transmission method in this embodiment of the present invention is described in detail above with reference to FIG. 1 to FIG. 3, and a data transmission apparatus in an embodiment of the present invention is described in detail below with reference to FIG. 4.

Figure 4:
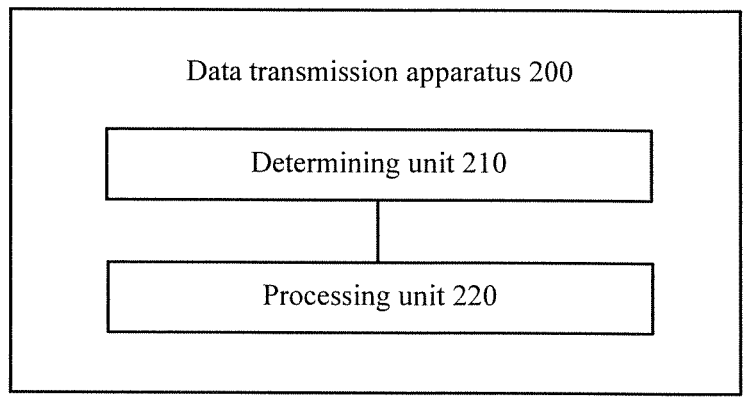
FIG. 4 is a schematic block diagram of a data transmission apparatus according to an embodiment of the present invention.

FIG. 4 shows a data transmission apparatus 200 according to an embodiment of the present invention. As shown in FIG. 4, the apparatus 200 includes:

a determining unit 210, configured to determine, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end; and a processing unit 220, configured to add the target bit sequence to length bits that are in a legacy signal field of a target preamble, perform transmit power enhancement processing on a legacy short training field, a legacy long training field, and the legacy signal field that are in the target preamble according to the transmit power amplification limit, and send the target preamble to the receive end, where the target preamble and the target data are carried in a same data frame.

Optionally, the determining unit 210 is specifically configured to determine a mapping entry according to the preset rule, where a mapping relationship between N data lengths and N bit sequences is recorded in the mapping entry, there is a one-to-one correspondence between the N data lengths and the N bit sequences, and the data length of the target data belongs to the N data lengths;

configured to determine, according to the system state, PAPRs respectively corresponding to the N bit sequences;

configured to determine at least one bit sequence pair according to a preset threshold, where one bit sequence pair includes one to-be-modified bit sequence and one reference bit sequence, the to-be-modified bit sequences included in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end;

configured to modify the mapping entry according to the bit sequence pair, so as to replace the to-be-modified bit sequence in each bit sequence pair with the reference bit sequence; and configured to search for the modified mapping entry according to the data length of the target data sent to the receive end, so as to determine the target bit sequence.

Optionally, if the to-be-modified bit sequence in one bit sequence pair has at least two candidate bit sequences among the N bit sequences, the reference bit sequence determined by the determining unit 210 is a bit sequence whose corresponding data length is the minimum of the at least two candidate bit sequences, where a PAPR corresponding to the candidate bit sequence is less than or equal to the preset threshold, and the data length corresponding to the to-be-modified bit sequence is less than a data length corresponding to the candidate bit sequence.

Optionally, the determining unit 210 is specifically configured to determine, according to the preset rule, a first bit sequence that corresponds to the data length of the target data sent to the receive end; and configured to determine the target bit sequence from at least one second bit sequence, where in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

Optionally, the determining unit 210 is further configured to determine that the PAPR corresponding to the first bit sequence is greater than a preset threshold, where the preset threshold is less than the power amplification limit of the transmit end, and the PAPR corresponding to the second bit sequence is less than or equal to the preset threshold.

Optionally, when there are at least two second bit sequences, the target bit sequence determined by the determining unit 210 is a bit sequence whose corresponding data length is the minimum of the at least two second bit sequences.

Optionally, the processing unit 220 is specifically configured to perform transmit power enhancement processing on the legacy short training field, the legacy long training field, and the legacy signal field that are in the target preamble according to the PAPR corresponding to the target bit sequence and the transmit power amplification limit.

Optionally, the processing unit 220 is specifically configured to perform transmit power enhancement processing on the legacy short training field, the legacy long training field, and the legacy signal field that are in the target preamble according to the preset threshold and the transmit power amplification limit.

The data transmission apparatus 200 according to this embodiment of the present invention may correspond to the transmit end device in the method in the embodiment of the present invention; moreover, units, that is, modules, in the data transmission apparatus 200 and the foregoing other operations and/or functions are respectively used for implementing corresponding procedures in the method 100 in FIG. 2, and for the purpose of conciseness, details are not described herein again.

According to the data transmission apparatus in this embodiment of the present invention, the transmit end replaces a bit sequence that corresponds to a data length of target data needing to be transmitted to the transmit end with a bit sequence having a longer corresponding data length and a lower PAPR, and adds the bit sequence to an L-SIG field of a preamble, which can effectively reduce a PAPR of the L-SIG field, so that the PAPR of the L-SIG field is in a linear range of a power amplifier, and the preamble can be sent to a receive end after transmit power amplification is performed on the preamble, thereby improving an effect of obtaining accurate length information by the receive end. Because the data length that corresponds to the bit sequence carried in the L-SIG field is greater than the data length of the actually sent data, it can be ensured that a transmission process is not interfered, and accuracy of transmission can be ensured, so that a throughput rate of a system can be improved, and data transmission performance and user experience can be improved.

The data transmission method in this embodiment of the present invention is described in detail above with reference to FIG. 1 to FIG. 3, and a data transmission device in an embodiment of the present invention is described in detail below with reference to FIG. 5.

Figure 5:
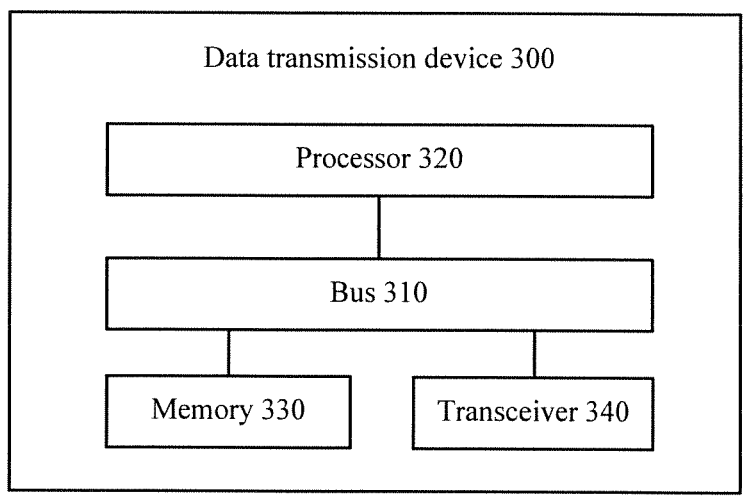
FIG. 5 is a schematic structural diagram of a data transmission device according to an embodiment of the present invention.

FIG. 5 shows a data transmission device 300 according to an embodiment of the present invention. As shown in FIG. 7, the device 300 includes:

a bus 310;
a processor 320 connected to the bus 310;
a memory 330 connected to the bus 310; and
a transceiver 340 connected to the bus 310.

The processor 320 invokes, by using the bus 310, a program stored in the memory 330, so as to determine, based on a preset rule and a system state, a target bit sequence according to a data length of target data sent to a receive end, where in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end; and add the target bit sequence to length bits that are in a legacy signal field of a target preamble, perform transmit power enhancement processing on a legacy short training field, a legacy long training field, and the legacy signal field that are in the target preamble according to the transmit power amplification limit, and send the target preamble to the receive end by using the transceiver 340, where the target preamble and the target data are carried in a same data frame.

Optionally, the processor 320 is specifically configured to determine a mapping entry according to the preset rule, where a mapping relationship between N data lengths and N bit sequences is recorded in the mapping entry, there is a one-to-one correspondence between the N data lengths and the N bit sequences, and the data length of the target data belongs to the N data lengths;

determine, according to the system state, PAPRs respectively corresponding to the N bit sequences;

determine at least one bit sequence pair according to a preset threshold, where one bit sequence pair includes one to-be-modified bit sequence and one reference bit sequence, the to-be-modified bit sequences included in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end;

modify the mapping entry according to the bit sequence pair, so as to replace the to-be-modified bit sequence in each bit sequence pair with the reference bit sequence; and search for the modified mapping entry according to the data length of the target data sent to the receive end, so as to determine the target bit sequence.

Optionally, if the to-be-modified bit sequence in one bit sequence pair has at least two candidate bit sequences among the N bit sequences, the reference bit sequence determined by the processor 320 is a bit sequence whose corresponding data length is the minimum of the at least two candidate bit sequences, where a PAPR corresponding to the candidate bit sequence is less than or equal to the preset threshold, and the data length corresponding to the to-be-modified bit sequence is less than a data length corresponding to the candidate bit sequence.

Optionally, the processor 320 is specifically configured to determine, according to the preset rule, a first bit sequence that corresponds to the data length of the target data sent to the receive end; and determine the target bit sequence from at least one second bit sequence, where in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

Optionally, the processor 320 is further configured to determine that the PAPR corresponding to the first bit sequence is greater than a preset threshold, where the preset threshold is less than the power amplification limit of the transmit end, and the PAPR corresponding to the second bit sequence is less than or equal to the preset threshold.

Optionally, when there are at least two second bit sequences, the target bit sequence determined by the processor 320 is a bit sequence whose corresponding data length is the minimum of the at least two second bit sequences.

Optionally, the processor 320 is specifically configured to perform transmit power enhancement processing on the legacy short training field, the legacy long training field, and the legacy signal field that are in the target preamble according to the PAPR corresponding to the target bit sequence and the transmit power amplification limit.

Optionally, the processor 320 is specifically configured to perform transmit power enhancement processing on the legacy short training field, the legacy long training field, and the legacy signal field that are in the target preamble according to the preset threshold and the transmit power amplification limit.

In this embodiment of the present invention, the processor may also be referred to as a CPU. The memory may include a read-only memory and a random access memory, and provide an instruction and data to the processor. A part of the memory may further include a non-volatile random access memory (NVRAM). In a specific application, a data transmission device may be built in or may be, for example, a standard Ethernet communications device such as a personal computer, and modules of the data transmission device are coupled together by using a bus system. Besides including a data bus, the bus system further includes a power bus, a control bus, and a status signal bus.

The processor may implement or perform steps and logical block diagrams disclosed in the method embodiment of the present invention. A general purpose processor may be a microprocessor or the processor may be any conventional processor, decoder, or the like. Steps of the methods disclosed with reference to the embodiments of the present invention may be directly executed and completed by means of a hardware processor, or may be executed and completed by using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and a decoding unit or processing unit reads information in the memory and completes the steps in the foregoing method in combination with hardware of the decoding unit or processing unit.

It should be understood that in the embodiments of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor or the like.

In an implementation process, the steps of the foregoing method may be implemented by using a hardware integrated logic circuit in the processor or instructions in a form of software. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor. To avoid repetition, details are not described herein again.

The data transmission device 300 according to this embodiment of the present invention may correspond to the transmit end device in the method in the embodiment of the present invention; moreover, units, that is, modules, in the data transmission device 300 and the foregoing other operations and/or functions are respectively used for implementing corresponding procedures in the method 100 in FIG. 2, and for the purpose of conciseness, details are not described herein again.

According to the data transmission device in this embodiment of the present invention, the transmit end replaces a bit sequence that corresponds to a data length of target data needing to be transmitted to the transmit end with a bit sequence having a longer corresponding data length and a lower PAPR, and adds the bit sequence to an L-SIG field of a preamble, which can effectively reduce a PAPR of the L-SIG field, so that the PAPR of the L-SIG field is in a linear range of a power amplifier, and the preamble can be sent to a receive end after transmit power amplification is performed on the preamble, thereby improving an effect of obtaining accurate length information by the receive end. Because the data length that corresponds to the bit sequence carried in the L-SIG field is greater than the data length of the actually sent data, it can be ensured that a transmission process is not interfered, and accuracy of transmission can be ensured, so that a throughput rate of a system can be improved, and data transmission performance and user experience can be improved.

It should be understood that sequence numbers of the foregoing processes do not mean execution orders in various embodiments of the present invention. The execution orders of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, the method comprising:
   determining, by a transmit end device and based on a preset rule and a system state, a target bit sequence according to a data length of target data sent to a receive end, wherein in the preset rule, the data length of the target data is less than a data length corresponding to the target bit sequence, and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end;
   adding the target bit sequence to length bits that are in a legacy signal field of a target preamble;
   performing transmit power enhancement processing on a legacy short training field, a legacy long training field, and the legacy signal field that are in the target preamble according to the transmit power amplification limit; and
   sending the target preamble to the receive end, wherein the target preamble and the target data are carried in a same data frame.

2. The method according to claim 1, wherein determining, by the transmit end device and based on a preset rule and a system state, the target bit sequence according to the data length of target data sent to the receive end comprises:
   determining, by the transmit end, a mapping entry according to the preset rule, wherein a mapping relationship between N data lengths and N bit sequences is recorded in the mapping entry, there is a one-to-one correspondence between the N data lengths and the N bit sequences, and the data length of the target data belongs to the N data lengths;
   determining, according to the system state, PAPRs respectively corresponding to the N bit sequences;
   determining at least one bit sequence pair according to a preset threshold, wherein one bit sequence pair comprises one to-be-modified bit sequence and one reference bit sequence, the to-be-modified bit sequences comprised in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end;
   modifying the mapping entry according to the bit sequence pair, so as to replace the to-be-modified bit sequence in each bit sequence pair with the reference bit sequence; and
   searching for the modified mapping entry according to the data length of the target data sent to the receive end, so as to determine the target bit sequence.

3. The method according to claim 2, wherein when the to-be-modified bit sequence in one bit sequence pair has at least two candidate bit sequences among the N bit sequences, the reference bit sequence is a bit sequence whose corresponding data length is the minimum of the at least two candidate bit sequences, wherein a PAPR corresponding to the candidate bit sequence is less than or equal to the preset threshold, and the data length corresponding to the to-be-modified bit sequence is less than a data length corresponding to the candidate bit sequence.

4. The method according to claim 1, wherein determining, by the transmit end device and based on the preset rule and the system state, the target bit sequence according to the data length of target data sent to the receive end comprises:
   determining, by the transmit end according to the preset rule, a first bit sequence that corresponds to the data length of the target data sent to the receive end; and
   determining the target bit sequence from at least one second bit sequence, wherein in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

5. The method according to claim 4, wherein before determining the target bit sequence from at least one second bit sequence, the method further comprises:
   determining that the PAPR corresponding to the first bit sequence is greater than a preset threshold, wherein the preset threshold is less than the power amplification limit of the transmit end, and the PAPR corresponding to the second bit sequence is less than or equal to the preset threshold.

6. The method according to claim 5, wherein when there are at least two second bit sequences, the target bit sequence is a bit sequence whose corresponding data length is the minimum of the at least two second bit sequences.

7. The method according to claim 1, wherein performing the transmit power enhancement processing on the legacy short training field, the legacy long training field, and the legacy signal field that are in the target preamble according to the transmit power amplification limit comprises:
performing transmit power enhancement processing on the legacy short training field, the legacy long training field, and the legacy signal field that are in the target preamble according to the PAPR corresponding to the target bit sequence and the transmit power amplification limit.

8. The method according to claim 2, wherein performing the transmit power enhancement processing on a legacy short training field, the legacy long training field, and the legacy signal field that are in the target preamble according to the transmit power amplification limit comprises:
performing transmit power enhancement processing on the legacy short training field, the legacy long training field, and the legacy signal field that are in the target preamble according to the preset threshold and the transmit power amplification limit.

9. A data transmission apparatus, wherein the apparatus comprises:
a determining unit, configured to determine, based on a preset rule and a system state, a target bit sequence according to a data length of target data sent to a receive end, wherein in the preset rule, the data length of the target data is less than a data length corresponding to the target bit sequence; and in the system state, a peak-to-average power ratio PAPR corresponding to the target bit sequence is less than a PAPR that corresponds to a bit sequence corresponding to the data length of the target data, and the PAPR corresponding to the target bit sequence is less than a transmit power amplification limit of the transmit end; and
a processing unit, configured to:
add the target bit sequence to length bits that are in a legacy signal field of a target preamble;
perform transmit power enhancement processing on a legacy short training field, a legacy long training field, and the legacy signal field that are in the target preamble according to the transmit power amplification limit; and
send the target preamble to the receive end, wherein the target preamble and the target data are carried in a same data frame.

10. The apparatus according to claim 9, wherein the determining unit is configured to:
determine a mapping entry according to the preset rule, wherein a mapping relationship between N data lengths and N bit sequences is recorded in the mapping entry, there is a one-to-one correspondence between the N data lengths and the N bit sequences, and the data length of the target data belongs to the N data lengths;
determine, according to the system state, PAPRs respectively corresponding to the N bit sequences;
determine at least one bit sequence pair according to a preset threshold, wherein one bit sequence pair comprises one to-be-modified bit sequence and one reference bit sequence, the to-be-modified bit sequences comprised in the bit sequence pairs are different from each other, a PAPR corresponding to the to-be-modified bit sequence is greater than the preset threshold, a PAPR corresponding to the reference bit sequence is less than or equal to the preset threshold, in a bit sequence pair, a data length corresponding to the to-be-modified bit sequence is less than a data length corresponding to the reference bit sequence, and the preset threshold is less than the transmit power amplification limit of the transmit end;
modify the mapping entry according to the bit sequence pair, so as to replace the to-be-modified bit sequence in each bit sequence pair with the reference bit sequence; and
search for the modified mapping entry according to the data length of the target data sent to the receive end, so as to determine the target bit sequence.

11. The apparatus according to claim 10, wherein when the to-be-modified bit sequence in one bit sequence pair has at least two candidate bit sequences among the N bit sequences, the reference bit sequence determined by the determining unit is a bit sequence whose corresponding data length is the minimum of the at least two candidate bit sequences, wherein a PAPR corresponding to the candidate bit sequence is less than or equal to the preset threshold, and the data length corresponding to the to-be-modified bit sequence is less than a data length corresponding to the candidate bit sequence.

12. The apparatus according to claim 9, wherein the determining unit is configured to:
determine, according to the preset rule, a first bit sequence that corresponds to the data length of the target data sent to the receive end; and
determine the target bit sequence from at least one second bit sequence, wherein in the system state, a PAPR corresponding to the first bit sequence is greater than a PAPR corresponding to the second bit sequence, the PAPR corresponding to the second bit sequence is less than the transmit power amplification limit of the transmit end, and in the preset rule, the data length corresponding to the first bit sequence is less than a data length corresponding to the second bit sequence.

13. The apparatus according to claim 12, wherein the determining unit is further configured to determine that the PAPR corresponding to the first bit sequence is greater than a preset threshold, wherein the preset threshold is less than the power amplification limit of the transmit end, and the PAPR corresponding to the second bit sequence is less than or equal to the preset threshold.

14. The apparatus according to claim 13, wherein when there are at least two second bit sequences, the target bit sequence determined by the determining unit is a bit sequence whose corresponding data length is the minimum of the at least two second bit sequences.

15. The apparatus according to claim 9, wherein the processing unit is configured to perform transmit power enhancement processing on the legacy short training field, the legacy long training field, and the legacy signal field that are in the target preamble according to the PAPR corresponding to the target bit sequence and the transmit power amplification limit.

16. The apparatus according to claim 10, wherein the processing unit is configured to perform transmit power enhancement processing on the legacy short training field, the legacy long training field, and the legacy signal field that are in the target preamble according to the preset threshold and the transmit power amplification limit.

* * * * *